United States Patent Office 3,199,988
Patented Aug. 10, 1965

3,199,988
PROCESS FOR MAKING A WHIPPABLE COMPOSITION
Robert F. Kozlik and James L. Swanson, Minneapolis, Minn., assignors to General Mills, Inc., a corporation of Delaware
No Drawing. Filed June 20, 1962, Ser. No. 203,735
6 Claims. (Cl. 99—139)

The present invention relates to a process for preparing a whippable composition. More particularly, it relates to a process for preparing a composition which can be whipped to provide a dessert topping or icing for cakes and the like.

Powdered compositions for use in preparing whipped toppings are known. Such materials offer the advantage of ease of handling due to their free flowing character and freedom from spoilage on storage for long periods of time due primarily to their low moisture content. However, most of these compositions have not enjoyed much commercial success because they are not readily whipped and perform in an inconsistent manner. For example, a paste emulsion of skim milk solids, fat, sucrose, and a mixture of mono- and diglycerides, while readily whipped when added to whole milk, has been found to be virtually unusable when dried. In the dried form an excessive whipping period is required even when a mechanical beater is employed. Some improvements in whippability apparently can be obtained by substituting a water soluble protein such as sodium caseinate for the milk solids, but the overrun on whipping is usually low, the texture heavy and pasty, and the after-taste or mouth feel greasy.

It has recently been proposed to prepare whippable compositions by drying an emulsion of a fat and a partial ester of an edible glycol and a higher saturated fatty acid in a matrix of hydrophilic encapsulating solids selected from proteinaceous materials and mixtures of proteinaceous and carbohydrate materials. While such products function satisfactorily as to whippability, their preparation involves several steps including blending of the ingredients, preparation of an emulsion and drying of the prepared emulsion by such methods as spray-drying. It would be highly desirable to be able to prepare whippable compositions without having to first emulsify the ingredients and then dry the resulting emulsion by spray-drying, for example.

Therefore, it is an object of the present invention to provide a simplified method of preparing whippable compositions.

Another object of the invention is to provide such a method which eliminates the necessity of forming and drying an emulsion of the ingredients.

These and other objects will become apparent from the following detailed discussion.

We have now discovered that whippable compositions can be prepared by impact milling a mixture of sugar, emulsifier and optionally other ingredients including a proteinaceous material and then intensively blending the resulting milled mixture with shortening. If the other ingredients have not been added during the impact milling step, they can be added during or prior to the intensive blending step. The compositions so prepared are easily and readily whipped to provide toppings or icings having excellent volume, spreadability, texture and eating properties.

The shortening can be any of those commonly employed in food products. Thus any combination of edible oils, semisolid or solid fats can be employed. Such shortening materials can be partially or fully hydrogenated. Examples of suitable shortenings include: lard, modified lard, butter, margarine, and various animal and vegetable oils. Representative of the latter are coconut oil, palm kernel oil, cottonseed oil, peanut oil, olive oil, sunflower seed oil, sesame oil, corn oil, safflower oil, poppyseed oil, soybean oil and the like. Preferably, the shortening is an oil or a low melting fat.

An emulsifier is also used in the process of the present invention. Representative of such compounds are mono- and diglycerides of fat forming fatty acids, such as mono- and diolein, monostearin, and dipalmitin; polyoxyalkylene ethers of fatty esters of polyhydric alcohols, such as the polyoxyethylene ethers of sorbitan monostearate or the polyoxyethylene ethers of sorbitan distearate; mono- and diesters of glycols and fatty acids such as propylene glycol monostearate; and partial esters of carboxylic acids such as lactic, citric, and tartaric acids with the mono- and diglycerides of fatty acids, such as glyceryl lactopalmitate. The fatty acids used to prepare the above emulsifiers include those derived from beef tallow and castor, coconut, cottonseed, mustard seed, palm, peanut, rapeseed, rice bran, soybean, tall and marine oils. A preferred emulsifier is glyceryl lactopalmitate.

Suitable sugars for use in the invention include any of the commonly used granular sugars, including sucrose, dextrose, maltose, fructose, lactose and brown and invert sugars as well as mixtures of said sugars. Such sugars can also be used in powdered form. Corn syrup solids can be employed when it is desired to produce toppings having reduced sweetness.

A wide variety of proteinaceous materials can be employed. Representative thereof are non-fat milk solids, whey solids, water soluble soy protein derivatives, egg albumen, dried cream cheese, gelatin and sodium caseinate. The protein stabilizes the topping or icing prepared from the whippable composition and is preferably sodium caseinate.

The whippable compositions prepared by our process can also contain other ingredients such as flavoring agents, dyes or colorants, lecithin or hydroxy lecithin, citric acid, fumaric acid, vitamins, minerals and the like. Suitable flavoring agents include fruit flavors, chocolate, caramel, mint, butter, maple, spice, vanilla, and the like. The lecithin compound is used to increase the volume of the topping or icing. Such compounds are preferably used in the form of a dry mix (40%) on non-fat milk solids. Citric acid and fumaric acid also increase the volume of the toppings. Salts, vitamins and minerals can be included to increase the flavor and/or nutritional value of the toppings.

The amounts of the above-described ingredients can be varied over relatively wide limits. For example, the sugar is used in an amount sufficient to provide the desired sweetness level to the ultimate topping or icing. Likewise, the amount of the shortening will be sufficient to provide a stable topping which has good mouth feel but yet is not greasy. Also the emulsifier and proteinaceous material will be used in amounts sufficient to give good whipping properties to the whippable composition and to stabilize the topping, respectively. A preferred range of ingredients is as follows:

| Ingredients: | Percent by wt. |
|---|---|
| Shortening | 5.0–15.0 |
| Emulsifier | 3.0–10.0 |
| Sugar | 45.0–85.0 |
| Proteinaceous material | 2.0– 6.0 |
| Flavoring agents | 0.0–20.0 |
| Lecithin compound | 0.0– 1.5 |
| Citric acid or fumaric acid | 0.0– 0.6 |
| Vitamins, minerals | 0.0– 5.0 |
| Dyes or colorants | 0.0– 2.0 |

Especially good results are obtained when the lecithin compound and citric acid of fumaric acid are included in amounts of 0.2–1.5% and 0.05–0.2%, respectively.

As indicated above, the sugar and emulsifier are first subjected to an impact milling step according to our process. The porteinaceous material, flavoring agent(s) lecithin compound, citric acid, fumaric acid, vitamins, minerals, dyes and colorants can also be added, if desired, during this step. A portion of the shortening could also be included but the fat content of the whole composition at this point should not exceed about 6% by weight. Preferably, however, only the sugar and emulsifier are subjected to the impact milling. By impact milling is meant disintegration or shattering of a majority of the particles by impact as opposed to crushing, for example. Of course, some of the particles may also be crushed but the dominant action is disintegration or shattering. Various well known and commercially available impact milling devices can be used. One example is a Raymond vertical mill.

After the described impact milling step, the mixture is intensively blended with the shortening and remaining ingredients, if they were not added during the milling step. By intensive blending is meant that the shattered or disintegrated particles are vigorously agitated with the shortening so that substantially all of said particles are smeared with the shortening or have a film of the shortening on at least a portion of the surface thereof. The intensive blending is substantially a mixing operation with relatively little crushing of the particles occurring. Such intensive blending can be accomplished using a variety of well known and commercially available blending devices. Examples thereof are cake mix finishers, Fitzmills, Turbulizers and the like.

The conditions under which the impact milling and intensive blending steps are carried out can vary over relatively wide ranges. The only limitation is that the final composition must be readily and easily whipped. When using an 18" Raymond vertical mill for the first step, the sugar and emulsifier can be fed into the mill at a rate of about 5–20 lbs./min., for example. The feed temperature of the ingredients is preferably about 60–80° F. The temperature of the ingredients coming out of the mill is preferably below about 135° F. The temperature of the ingredients during the intensive blending operation is preferably kept below about 100° F.

The following examples serve to illustrate the present invention without, however, limiting the same thereto.

*Example I*

A white, vanilla flavored whippable composition was prepared from the following ingredients:

Ingredients: Percent by wt.
    Sucrose _____ 51.4
    Corn syrup solids _____ 30.0
    Margarine oil (lightly hydrogenated blend of
        cottonseed oil and soybean oil) ___ 9.0
    Glyceryl lactopalmitate _____ 5.0
    Sodium caseinate _____ 3.0
    Lecithin (40% by wt. on non-fat milk solids) _ 0.8
    Vanilla powder _____ 0.4
    Salt _____ 0.3
    Burnt almond flavor _____ 0.1

The sucrose and glyceryl lactopalmitate were blended and then impact milled by passage through a Raymond 18" vertical mill (4–4 whizzer setting). The feed rate was 15 lbs./min., the blended feed was at room temperature and the impacted mixture coming out of the mill was at about 130° F. The remaining ingredients were intensively blended with the milled mixture of sugar and glyceryl lactopalmitate by two passes of the whole composition through a cake mix finisher (7 blades revolving at 3000 r.p.m.). The resulting whippable composition consisted of an intimately blended composition of fine particle size. Substantially all of the particles had a film of oil on at least part of the surface thereof.

Six ounces of the whippable composition were mixed with six ounces of water and whipped at high speed on a mechanical mixer. After about 2½–3½ minutes, the whipped topping reached a density of approximately 0.40 g./cc. The finished topping was firm enough to stand in peaks and when spread on cake, provided a delicious icing which was very stable, did not dry out and which had excellent mouth feel and eating properties.

An equally delicious topping can be prepared by replacing the water with six ounces of milk.

*Examples II and III*

Whippable compositions having chocolate and caramel flavors are prepared by impact milling and intensively blending the following ingredients by the same procedure as set forth in Example I:

| Ingredients | Percent by wt. | |
| --- | --- | --- |
| | Example II | Example III |
| Sucrose | 69.4 | 63.4 |
| Margarine oil (See Example I) | 9.0 | 9.0 |
| Glyceryl lactopalmitate | 5.0 | 5.0 |
| Sodium caseinate | 3.0 | 3.0 |
| Cocoa | 12.0 | |
| Butterscotch flavor | | 9.0 |
| Caramel flavor | | 9.0 |
| Lecithin (See Example I) | 0.8 | 0.8 |
| Vanilla powder | 0.4 | 0.4 |
| Salt | 0.3 | 0.3 |
| Citric acid | 0.1 | 0.1 |

The whippable compositions give excellent icings when six ounces of the respective compositions are blended and whipped with six ounces of water or milk.

The process of the present invention, as illustrated by the above examples, provides a simplified method for preparing highly suitable whippable compositions. No emulsion need be formed and no spray drying step is required. The whippable compositions so prepared can be used to prepare toppings or icings for a wide variety of products including cakes, pies, rolls, puddings and the like.

It is to be understood that the invention is not to be limited to the exact details of operation or the exact processes and compositions shown or described, as obvious modifications will be apparent to those skilled in the art and the invention is to be limited only by the scope of the appended claims.

The embodiments of the invention in which an exclusive property or privilege is claimed are defined as follows:

1. A process of making a dry whippable composition for use in the preparation of dessert toppings and icings from sugar, emulsifier, shortening and a proteinaceous material which comprises (1) impact milling a mixture of at least the sugar and emulsifier and then (2) intensively blending the resulting product with any remaining proteinaceous material and the shortening so that substantially all of the impact milled particles of said product are smeared with the shortening to produce the dry whippable composition without further treatment.

2. The process of claim 1 wherein the emulsifier is glyceryl lactopalmitate.

3. The process of claim 1 wherein the shortening is selected from the group consisting of oils and low melting fats.

4. The process of claim 1 wherein the proteinaceous material is sodium caseinate.

5. The process of making a dry whippable composition for use in the preparation of dessert toppings and icings from 45 to 85 parts sugar, 5 to 15 parts shortening, 3 to 10 parts emulsifier, 2 to 6 parts proteinaceous material, 0 to 20 parts flavoring agents, 0 to 1.5 parts lecithin compound, 0 to 0.2 part citric acid and 0 to 2.0 parts dye which comprises (1) impact milling a mixture of at least the sugar and emulsifier and then (2) intensively blending the resulting product with any of the other remaining ingredients and the shortening so that substantially all of the impact milled particles of said product are smeared with the shortening to produce the dry whippable composition without further treatment.

6. The process of claim 5 wherein the emulsifier is glyceryl lactopalmitate and the proteinaceous material is sodium caseinate.

References Cited by the Examiner

UNITED STATES PATENTS

| | | | |
|---|---|---|---|
| 2,846,314 | 8/58 | Aichele et al. | 99—139 |
| 2,874,053 | 2/59 | Mills | 99—94 |
| 2,913,342 | 11/59 | Cameron et al. | 99—139 X |
| 2,918,375 | 12/59 | Gibsen | 99—139 X |
| 2,970,918 | 2/61 | Petersen | 99—139 |
| 3,051,577 | 8/62 | Babayan et al. | 99—139 X |

A. LOUIS MONACELL, *Primary Examiner.*

BEATRICE H. STRIZAK, *Examiner.*